United States Patent
Fujimura et al.

(10) Patent No.: US 8,953,226 B2
(45) Date of Patent: Feb. 10, 2015

(54) IMAGE READING AND FORMING APPARATUS COMPRISING AN OPEN/CLOSING DETECTION PORTION WHEREIN A SENSOR DETECTS THE MOVABLE MEMBER MOVING IN THE GUIDE HOLE IN ACCORDANCE WITH THE OPEN/CLOSED STATE OF THE COVER

(71) Applicant: KYOCERA Document Solutions Inc., Osaka-shi, Osaka (JP)

(72) Inventors: Takeshi Fujimura, Osaka (JP); Takehiro Sato, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

(21) Appl. No.: 14/185,753

(22) Filed: Feb. 20, 2014

(65) Prior Publication Data

US 2014/0240792 A1    Aug. 28, 2014

(30) Foreign Application Priority Data

Feb. 22, 2013   (JP) .................................. 2013-032894

(51) Int. Cl.
  *H04N 1/40* (2006.01)
  *H04N 1/00* (2006.01)
  *G03G 15/00* (2006.01)
  *B41B 11/06* (2006.01)

(52) U.S. Cl.
  CPC ....... *H04N 1/00734* (2013.01); *H04N 1/00278* (2013.01); *H04N 1/00551* (2013.01)
  USPC ................ 358/449; 358/488; 399/16; 400/48

(58) Field of Classification Search
  None
  See application file for complete search history.

(56) References Cited

U.S. PATENT DOCUMENTS

| | | | | |
|---|---|---|---|---|
| 7,329,820 B2 * | 2/2008 | Yamamoto | ................. | 200/61.62 |
| 7,512,376 B2 * | 3/2009 | Suzuki | ........................... | 399/380 |
| 7,782,498 B2 * | 8/2010 | Hoshi | ............................ | 358/474 |
| 2011/0255130 A1 * | 10/2011 | Omoya | ........................ | 358/1.15 |

FOREIGN PATENT DOCUMENTS

JP            2012104880 A      5/2012

* cited by examiner

*Primary Examiner* — Steven Kau
(74) *Attorney, Agent, or Firm* — Allenman Hall McCoy Russell & Tuttle LLP

(57) ABSTRACT

An image reading apparatus includes placement member, pressing member, and open/close detection portion. Open/close detection portion detects opening and closing of pressing member. Open/close detection portion includes movable portion, guide hole, and sensor. When pressing member is opened, movable portion moves toward one side, thereby protruding to an area between placement member and pressing member, and when pressing member is closed, movable portion moves toward the other side. Movable portion extends along movement direction thereof. Guide hole of movable portion guides movement of movable portion in movement direction. Movable portion has a plurality of groove portions extending in movement direction, and groove portions partially include guide groove. Guide hole has guide protrusion protruding from inner circumferential surface thereof toward groove portion of movable portion, so as to guide movement of movable portion. Guide protrusion is formed only at position opposing to guide groove, of groove portions of movable portion.

14 Claims, 13 Drawing Sheets

BACK SURFACE ⟷ FRONT SURFACE

BACK SURFACE ⟵⟶ FRONT SURFACE though No. 2013-032894 filed on Feb. 22, 2013, the entire contents of which are incorporated herein by reference.

IMAGE READING AND FORMING APPARATUS COMPRISING AN OPEN/CLOSING DETECTION PORTION WHEREIN A SENSOR DETECTS THE MOVABLE MEMBER MOVING IN THE GUIDE HOLE IN ACCORDANCE WITH THE OPEN/CLOSED STATE OF THE COVER

INCORPORATION BY REFERENCE

This application is based upon and claims the benefit of priority from the corresponding Japanese Patent Application No. 2013-032894 filed on Feb. 22, 2013, the entire contents of which are incorporated herein by reference.

BACKGROUND

The present disclosure relates to an image reading apparatus having a pressing member for pressing a document, and an image forming apparatus including the image reading apparatus.

Conventionally, an image reading apparatus is known which reads a document and generates image data of the document. The image reading apparatus is mounted on an image forming apparatus such as a multifunction peripheral, for example. The image reading apparatus includes a placement member for placing a document thereon, a light source for radiating light to the document, a line sensor for performing photoelectric conversion of light reflected from the document and accumulating electric charge, and the like. Generally, on the placement member, a pressing member for pressing a document is attached so as to be openable and closable with respect to the placement member.

Such an image reading apparatus detects the size of the document placed on the placement member prior to reading of the document. Here, when the size detection of the document is performed, if the pressing member is fully opened, a large amount of the light from the light source leaks out, so that a user is dazzled, thus causing inconvenience. On the other hand, if the pressing member is fully closed, in the case where a white mat is provided on a pressing surface of the pressing member, the boundary between a portion where the document is present and a portion where the document is not present cannot be read accurately.

Therefore, in the conventional image reading apparatus, the placement member is provided with an open/close detection mechanism for detecting an open/close state (an inclination angle of the pressing member) of the pressing member.

The conventional open/close detection mechanism is composed of a movable portion (actuator) which moves in an up-down direction in accordance with opening or closing of the pressing member, a guide hole (through hole) for guiding movement in the up-down direction of the movable portion, a transmission type light sensor for detecting the position in the up-down direction of the movable portion, and the like. Each placement position of the movable portion and the light sensor is adjusted such that, when the inclination angle of the pressing member becomes a predetermined angle, a portion to be detected (a portion to be detected by the sensor) of the movable portion shields a detection area (a light path between a light emitting portion and a light receiving portion) of the light sensor.

In addition, in the conventional open/close detection mechanism, the movable portion is inserted into the guide hole, whereby the movable portion is held so as not to incline. That is, the movable portion slides in the up-down direction in contact with the inner circumferential surface of the guide hole. Thus, the movement direction of the movable portion can be defined to be a desired direction (up-down direction).

However, in the conventional open/close detection mechanism, the movable portion is not reliably held. Specifically, in the open/close detection mechanism of the conventional image reading apparatus, the movable portion may rotate about the central axis thereof. If the movable portion thus rotates, a movement route in the up-down direction of the portion to be detected of the movable portion deviates from the detection area of the light sensor, thus causing inconvenience. In this case, even if the inclination angle of the pressing member has become a predetermined angle, the portion to be detected of the movable portion does not shield the detection area of the light sensor.

SUMMARY

An image reading apparatus according to one aspect of the present disclosure includes a placement member, a pressing member, and an open/close detection portion. The placement member is a portion on which a document is placed. The pressing member is attached so as to be openable and closable with respect to the placement member, and presses a document placed on the placement member by being closed. The open/close detection portion detects opening and closing of the pressing member. The open/close detection portion includes a movable portion, a guide hole, and a sensor. When the pressing member is opened, the movable portion moves toward one side, thereby protruding to an area between the placement member and the pressing member, and when the pressing member is closed, the movable portion moves toward the other side opposite to the one side. The movable portion extends along a movement direction thereof. The movable portion is inserted into the guide hole, and the guide hole guides movement of the movable portion in the movement direction. The sensor detects a position of the movable portion. The movable portion has a plurality of groove portions extending in the movement direction, and at least one of the groove portions can work as a guide groove which guides the movement direction of the movable portion. The guide hole has a guide protrusion protruding from an inner circumferential surface thereof toward the groove portion of the movable portion, so as to guide movement of the movable portion. The guide protrusion is formed only at a position opposing to the guide groove, of the groove portions of the movable portion, on the inner circumferential surface of the guide hole.

An image forming apparatus according to another aspect of the present disclosure includes the image reading apparatus.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, an image forming apparatus including an image reading apparatus of the present disclosure will be described, using a monochrome multifunction peripheral as an example.

(Image Forming Apparatus)

Figure 1:
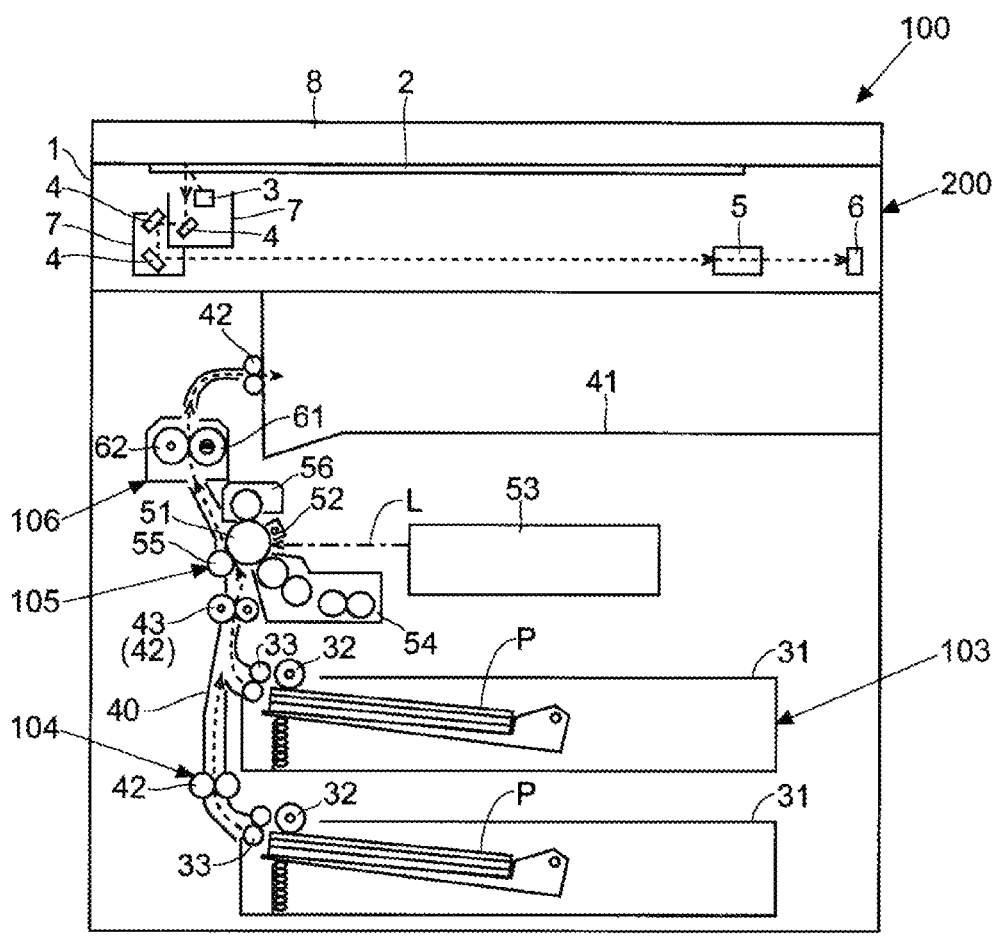
FIG. 1 is a schematic diagram of an image forming apparatus including an image reading apparatus according to an embodiment of the present disclosure.

As shown in FIG. 1, an image forming apparatus 100 of the present embodiment includes an image reading apparatus 200 provided on the upper side of a main body of the image forming apparatus 100. It is noted that the configuration of the image reading apparatus 200 will be described later in detail.

In the main body of the image forming apparatus 100, a sheet feed portion 103, a sheet conveyance portion 104, an image forming portion 105, and a fixing portion 106 are provided.

The sheet feed portion 103 has a sheet cassette 31 for accommodating a paper sheet P, and feeds the paper sheet P accommodated in the sheet cassette 31 to a sheet conveyance path 40. The sheet feed portion 103 is provided with a pickup roller 32 for drawing out one by one a paper sheet P accommodated in the sheet cassette 31. Further, the sheet feed portion 103 is provided with a sheet feed roller pair 33 for feeding, to the sheet conveyance path 40, a paper sheet P drawn out from the sheet cassette 31 while suppressing multi feed of paper sheets P. The sheet feed roller pair 33 includes a sheet feed roller and a separating roller disposed so as to oppose to each other.

The sheet conveyance portion 104 conveys, along the conveyance path 40, a paper sheet P fed to the conveyance path 40, and leads the paper sheet P via the image forming portion 105 and the fixing portion 106 to a discharge tray 41. The sheet conveyance portion 104 includes a plurality of conveying roller pairs 42 rotatably provided on the conveyance path 40. One pair of the plurality of conveying roller pairs 42 is a registration roller pair 43, which causes a paper sheet P to wait before the image forming portion 105, and then feeds the paper sheet P to the image forming portion 105 at an appropriate timing according to formation of a toner image to be performed in the image forming portion 105.

The image forming portion 105 forms a toner image based on image data of a document read by the image reading apparatus 200, and the like, and transfers the toner image onto a paper sheet P. The image forming portion 105 includes a photosensitive drum 51, a charging device 52, an exposure device 53, a developing device 54, a transfer roller 55, and a cleaning device 56.

The fixing portion 106 heats and pressurizes the toner image transferred on the paper sheet P, thereby fixing the toner image. The fixing portion 106 includes a fixing roller 61 having a heat generation source therein, and a pressure roller 62 to be pressed to the fixing roller 61. Then, the paper sheet P having the toner image transferred thereon passes between the fixing roller 61 and the pressure roller 62, whereby the paper sheet P is heated and pressurized. Thus, the toner image is fixed on the paper sheet P, whereby printing is completed.

(Image Reading Apparatus)

The image reading apparatus 200 includes a placement member 1 which allows a document to be placed thereon as a reading target. The placement member 1 includes a contact glass 2 fitted in an upper portion of a frame of the image reading apparatus 200. Document reading by the image reading apparatus 200 is performed for a document placed on the surface of the contact glass 2.

Inside the frame of the image reading apparatus 200, a lamp 3, a plurality of mirrors 4, a lens 5, a line sensor 6, and the like are provided. The lamp 3 radiates light to a document placed on the contact glass 2. Light (light from the lamp 3) reflected from the document is reflected by the mirrors 4, to be led to the lens 5. The lens 5 converges the reflected light and causes the converged reflected light to enter the line sensor 6. The line sensor 6 is composed of a CCD having a plurality of photoelectric conversion elements arranged in line along a primary scanning direction (a direction perpendicular to the drawing plane of FIG. 1). When receiving the light reflected by the document, the line sensor 6 performs photoelectric conversion pixel by pixel for each line, to accumulate electric charge, and outputs an analog signal in accordance with the accumulated electric charge. The analog signal outputted from the line sensor 6 is converted into digital image data.

In addition, the lamp 3 and the mirrors 4 are supported by a movement frame 7 which is movable in a secondary scanning direction (a direction parallel to the surface of the contact glass 2) perpendicular to the primary scanning direction. The lamp 3 and the mirrors 4 move in the secondary scanning direction upon reading of a document. Thus, reading of a document placed on the contact glass 2 is performed.

It is noted that the document reading is controlled by a reading control portion provided in the image reading apparatus 200. Image data of a document read by the image reading apparatus 200 is transferred to a main control portion which performs overall control of the image forming apparatus 100, whereby the image data is processed by various types of image processing.

Further, the image reading apparatus 200 includes a pressing member 8 for pressing a document placed on the placement member 1 (contact glass 2). The pressing member 8 is attached so as to be openable and closable with respect to the placement member 1.

Figure 2:
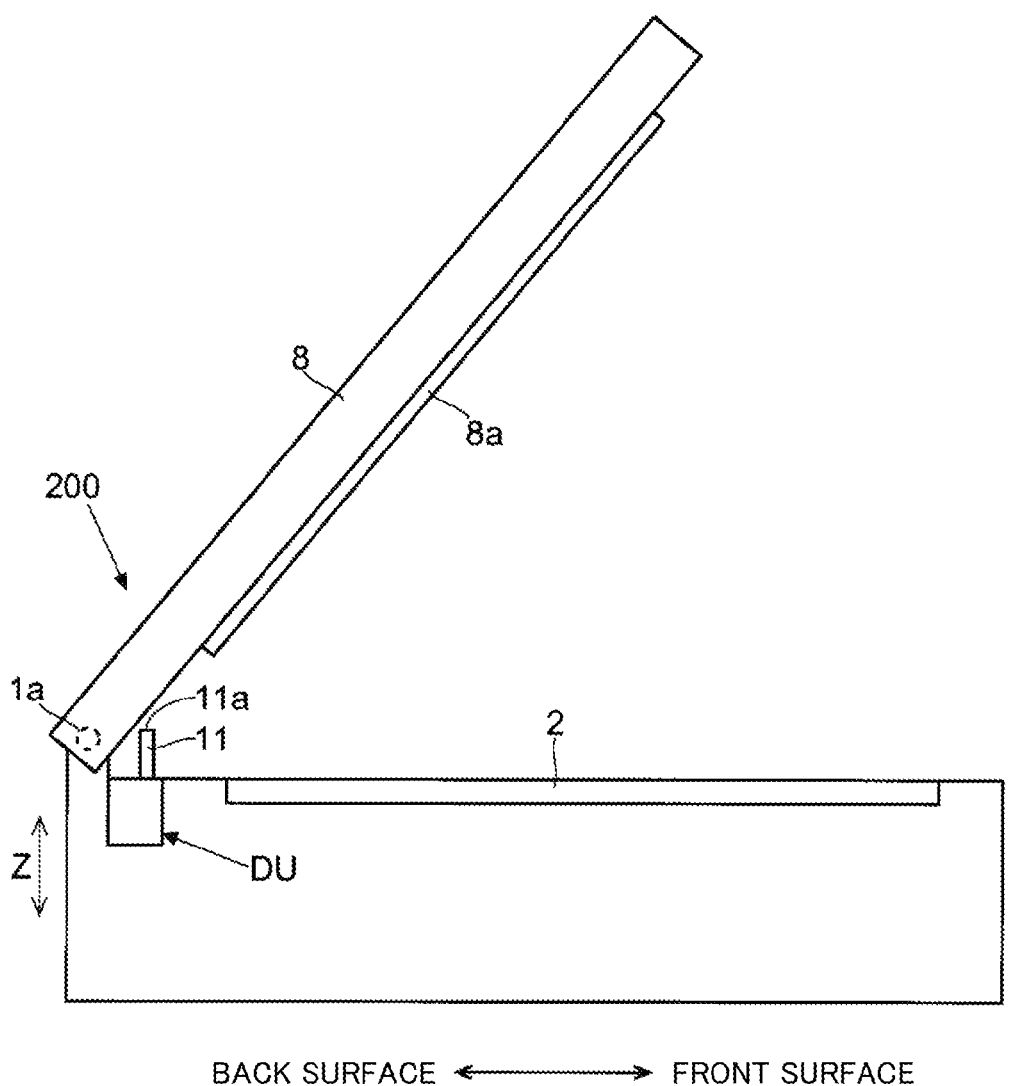
FIG. 2 is a diagram showing the image reading apparatus according to the embodiment of the present disclosure when a pressing member thereof is opened.

Specifically, as shown in FIG. 2, a rotation shaft 1a is provided on a main body back surface side of the placement member 1, and the pressing member 8 is attached so as to be rotatable about the rotation shaft 1a. Therefore, the pressing member 8 rotates with its portion on the main body front surface side being a free end so that the portion on the main body front surface side swings in an up-down direction, thereby becoming an open/close state with respect to the placement member 1 (contact glass 2). Thus, when the pressing member 8 is closed, the pressing member 8 overlaps the contact glass 2 so that the contact glass 2 is fully covered with the pressing member 8. Therefore, upon reading of a document placed on the contact glass 2, the document can be pressed by the pressing member 8. It is noted that a white mat 8a is provided on a portion facing to the contact glass 2, of the pressing member 8.

In addition, the image reading apparatus 200 (reading control portion) performs size detection for a document placed on the placement member 1 before reading of the document. The document size detection is performed by radiating light from the lamp 3 to the document and reading the boundary between a portion where the document is present and a portion where the document is not present based on output of the line sensor 6 receiving the reflected light.

Thus, upon the document size detection, the lamp 3 is lit up. Therefore, if the pressing member 8 is fully opened, a large amount of the light from the lamp 3 leaks out, so that a user is dazzled, thus causing inconvenience. On the other hand, if the pressing member 8 is fully closed, the white mat 8a is recognized as a document, so that the boundary between a portion where the document is present and a portion where the document is not present cannot be read accurately.

Figure 3:
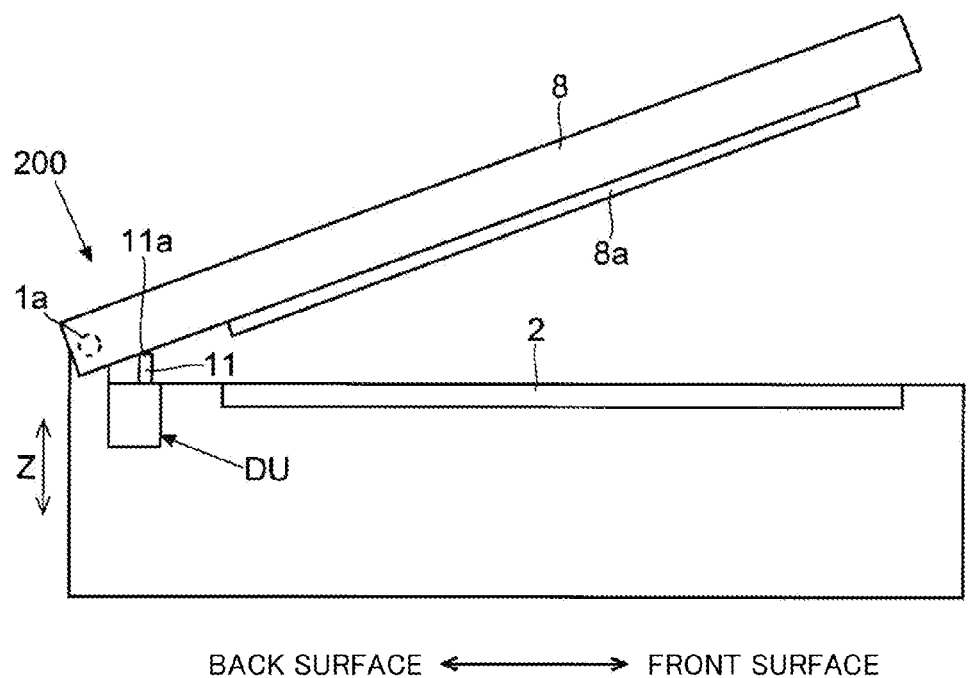
FIG. 3 is a diagram showing the state where the inclination angle of the pressing member of the image reading apparatus shown in FIG. 2 has become a predetermined angle.

Therefore, the placement member 1 is provided with an open/close detection unit DU (open/close detection portion) for detecting opening or closing of the pressing member 8 or the open/close state thereof (inclination angle). For example, the open/close detection unit DU is provided at a portion (a portion in the vicinity of the rotation shaft 1a which is a pivot of the pressing member 8) on the main body back surface side of the placement member 1. When the inclination angle of the pressing member 8 with respect to the contact glass 2 has become a predetermined angle (the state shown in FIG. 3), the open/close detection unit DU outputs a signal indicating that the inclination angle of the pressing member 8 has become the predetermined angle (outputs an H level signal indicating ON).

Thus, the image reading apparatus 200 (reading control portion) detects that the inclination angle of the pressing member 8 has become the predetermined angle, based on the output of the open/close detection unit DU. Then, when having detected that the inclination angle of the pressing member 8 has become the predetermined angle, the image reading apparatus 200 (reading control portion) executes document size detection. It is noted that the predetermined angle is about 35 degrees, for example. That is, the open/close detection unit DU changes its output level before the pressing member 8 is fully closed (the document size detection is executed before the pressing member 8 is fully closed).

(Open/Close Detection Unit)

Figure 4:
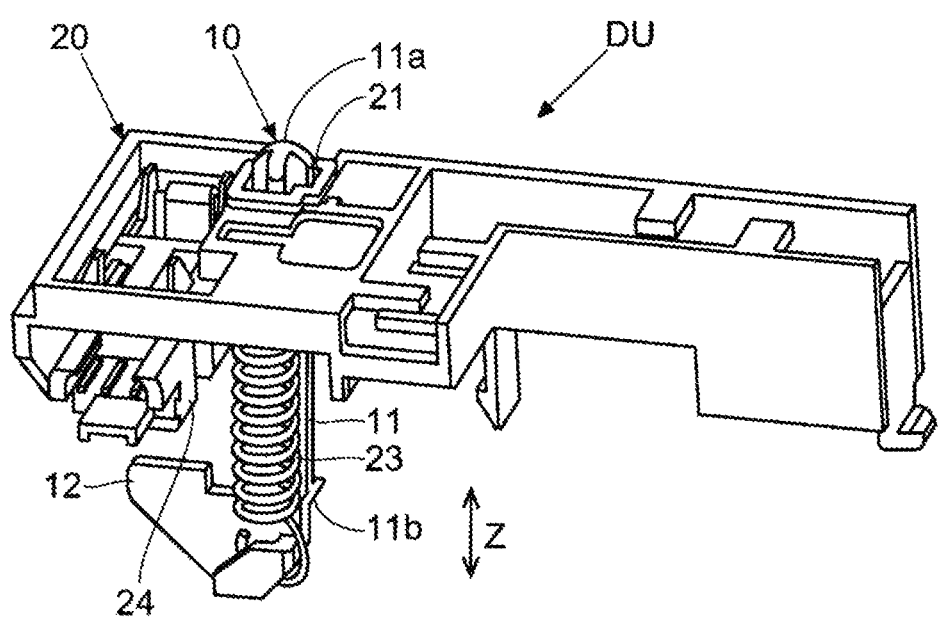
FIG. 4 is a perspective view of an open/close detection unit (a unit composed of a movable member having a movable portion, a holding member having a guide hole, and the like) provided in the image reading apparatus shown in FIG. 2.
Figure 5:
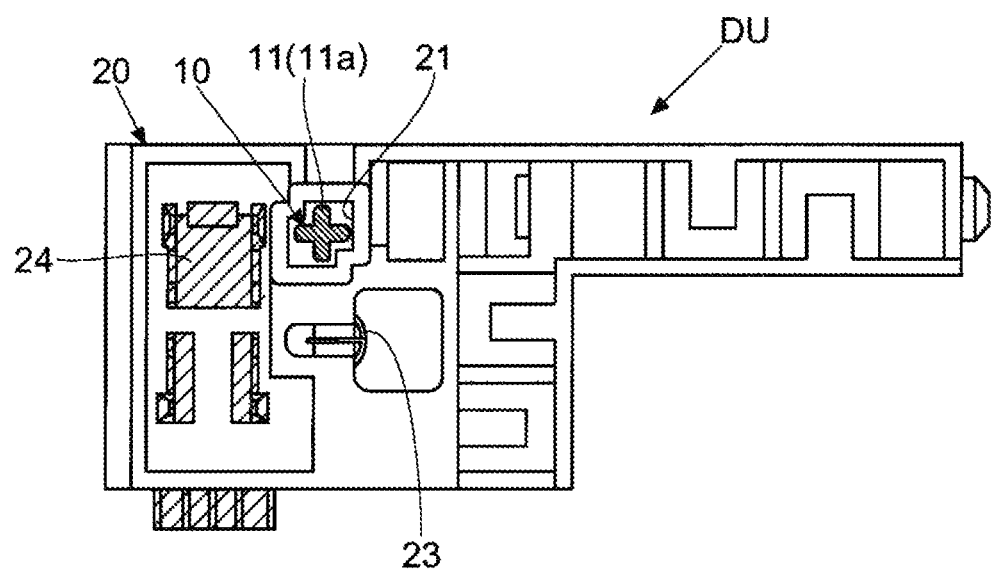
FIG. 5 is a plan view of the open/close detection unit shown in FIG. 4, as seen from a predetermined direction.

First, the entire configuration of the open/close detection unit DU will be described. The open/close detection unit DU includes a movable member 10 and a holding member 20 as shown in FIGS. 4 and 5.

The movable member 10 is held by the holding member 20, and is movable in a Z direction. Specifically, the movable member 10 has a rod-like movable portion 11 which slides in the Z direction in contact with the inner circumferential surface of a later-described guide hole 21 of the holding member 20, and the movable portion 11 is held by being inserted into the guide hole 21. Thus, movement in the Z direction of the movable member 10 is guided by the holding member 20 (guide hole 21). It is noted that the Z direction is a direction perpendicular to the surface of the contact glass 2 which is a placement surface on which a document is placed, and corresponds to a "movement direction" of the present disclosure.

The movable portion 11 extends linearly in the Z direction. One end 11a in the Z direction of the movable portion 11 protrudes toward one side (pressing member 8 side) in the Z direction with respect to the surface of the contact glass 2 when the pressing member 8 is opened (state in FIG. 2). In other words, the one end 11a protrudes toward an area between the placement member 1 and the pressing member 8. Therefore, when the pressing member 8 is closed, the one end 11a of the movable portion 11 is pressed by the pressing member 8 toward the other side (a side opposite to the one side) in the Z direction (state in FIG. 3), whereby the movable member 10 is moved toward the other side in the Z direction. Then, when the pressing member 8 is opened again, the pressing to the one end 11a of the movable portion 11 is gradually released, so that the movable member 10 is moved toward the one side in the Z direction.

In addition, the other end 11b (an end opposite to the one end 11a) in the Z direction of the movable portion 11 is located on the other side in the Z direction with respect to the surface of the contact glass 2. At the other end 11b of the movable portion 11, a detection piece 12 is formed which is used for detection by a sensor 24 described later. That is, the detection piece 12 is moved in the Z direction together with the movable portion 11 when the pressing member 8 is opened or closed. It is noted that the detection piece 12 may be integrated with the other end 11b of the movable portion 11, or may be attached later to the other end 11b of the movable portion 11 (may be a member separately provided from the movable portion 11).

The holding member 20 has the guide hole 21 penetrating in the Z direction. The movable portion 11 is inserted into the guide hole 21 so as to be slidable in the Z direction. While holding the movable member 10, the holding member 20 guides movement in the Z direction of the movable member 10 (the movable portion 11 slides in the Z direction in contact with the inner circumferential surface of the guide hole 21). In addition, a tension spring 23 for energizing the movable member 10 toward the one side in the Z direction is attached to the holding member 20. One end of the tension spring 23 is engaged with the holding member 20, and the other end of the tension spring 23 is engaged with the movable member 10 (detection piece 12). Therefore, the movable member 10 is constantly energized toward the one side in the Z direction by the tension spring 23. Therefore, when the one end 11a of the movable portion 11 is pressed by the pressing member 8, the movable member 10 is moved toward the other side in the Z direction, and when the one end 11a of the movable portion 11 is not pressed by the pressing member 8, the movable member 10 is not moved toward the other side in the Z direction but is moved to a predetermined position on the one side in the Z direction.

In addition, the sensor 24 is attached to the holding member 20. The sensor 24 is, for example, a transmission type light sensor, and has a light emitting portion and a light receiving portion. The sensor 24 changes its output depending on whether or not a light path (detection area) between the light emitting portion and the light receiving portion is shielded.

Figure 6:
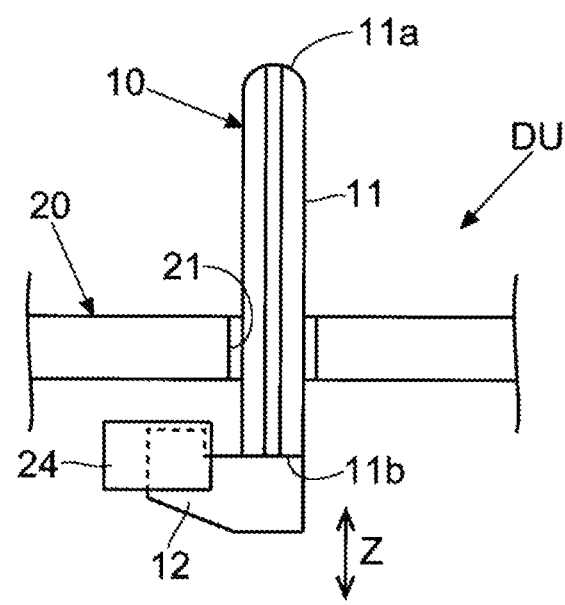
FIG. 6 is a view in the case where the movable portion of the open/close detection unit shown in FIG. 4 has moved toward one side (upward) in the movement direction.
Figure 7:
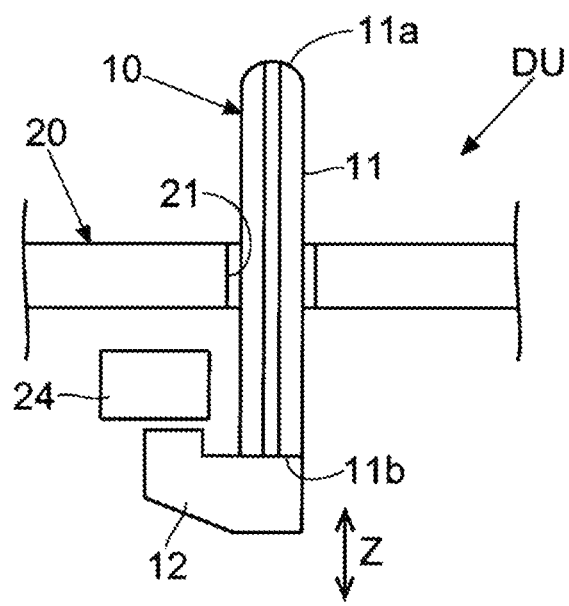
FIG. 7 is a view in the case where the movable portion of the open/close detection unit shown in FIG. 4 has moved toward the other side (downward) in the movement direction.

The detection area of the sensor 24 is positioned on a movement route of the detection piece 12 which moves in the Z direction in accordance with opening or closing of the pressing member 8. That is, the sensor 24 is a sensor for detecting the position in the Z direction of the movable member 10. Specifically, adjustment is made such that as shown in FIG. 6, when the pressing member 8 is opened, the detection area of the sensor 24 is shielded by the detection piece 12, and as shown in FIG. 7, when inclination of the pressing member 8 has become the predetermined angle, the detection piece 12 does not shield the detection area of the sensor 24. Thus, whether or not the inclination angle of the pressing member 8 has become the predetermined angle can be detected based on the output of the sensor 24. It is noted that the detection area of the sensor 24 may be shielded by the detection piece 12 when the inclination angle of the pressing member 8 has become the predetermined angle.

Next, the movable portion 11 and the guide hole 21 will be described in detail.

Figure 8:
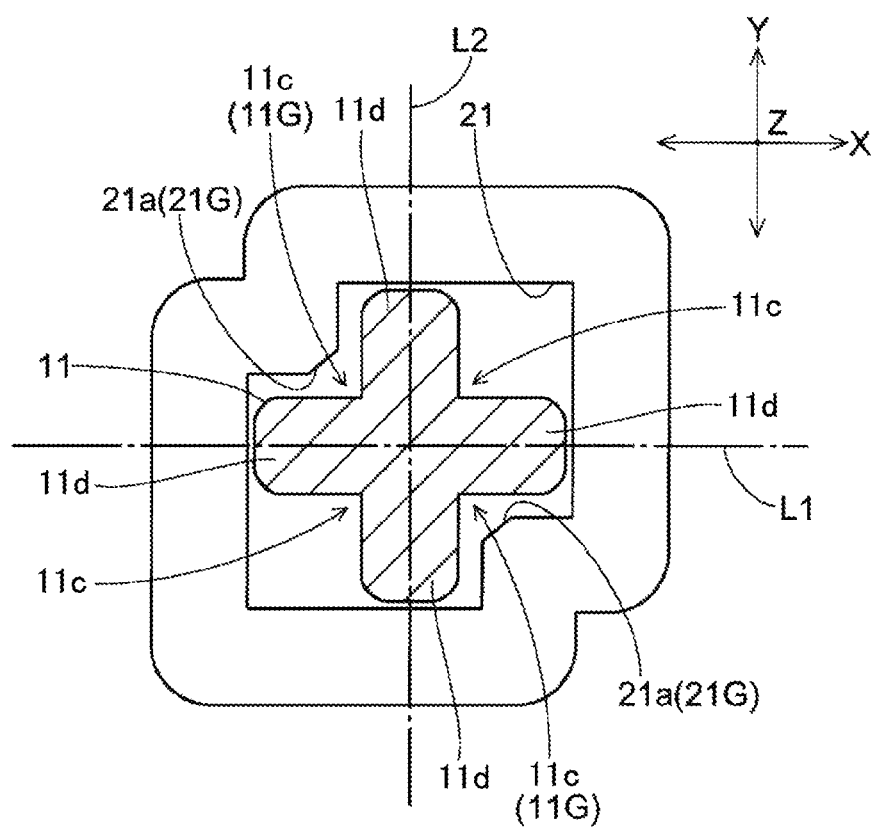
FIG. 8 is a plan view of the movable portion and the guide hole of the open/close detection unit shown in FIG. 4, as seen from the predetermined direction.

As shown in FIG. 8, the movable portion 11 is formed in a cross shape as seen from the one side in the Z direction (formed such that the shape in a sectional view along a direction perpendicular to the Z direction becomes a cross shape). As a result, the movable portion 11 has four groove portions 11c extending in the Z direction. Of the four groove portions 11c, two groove portions 11c that are diagonally positioned are guide grooves 11G contacting with the inner circumferential surface of the guide hole 21. That is, some of the four groove portions 11c are the guide grooves 11G. In other words, the four groove portions 11c partially include the guide grooves 11G.

It is noted that since the movable portion 11 is formed so as to have a cross shape as seen from the one side in the Z direction, the movable portion 11 has four ribs 11d extending in the Z direction as a result. The four groove portions 11c extending in the Z direction are defined by the four ribs 11d. As seen from the one side in the Z direction, the movable portion 11 has a symmetric shape with respect to each of two lines L1 (line extending in X direction) and L2 (line extending in Y direction) that orthogonally cross each other at the center point where the four ribs 11d intersect. That is, as seen from the one side in the Z direction, all the groove shapes of the four groove portions 11c are the same (the groove shapes of the two groove portions 11c that are the guide grooves 11G are the same as each other).

The guide hole 21 opens such that its opening shape (inner circumferential shape) is a polygonal shape as seen from the one side in the Z direction. Of the inner circumferential surface of the guide hole 21, two inner circumferential portions 21a that respectively oppose to the two groove portions 11c that are the guide grooves 11G protrude inward (guide protrusions 21G are formed at the two inner circumferential portions 21a). That is, the inner circumferential portions 21a protrude inward from the inner circumferential surface of the guide hole 21, in detail, protrude toward the two groove portions 11c. The two inner circumferential portions 21a thus protruding are the guide protrusions 21G, and they are diagonally positioned.

The two inner circumferential portions 21a protruding inward are each formed in a protruding shape along the groove shape of the corresponding groove portion 11c of the two groove portions 11c that are the guide grooves 11G. Therefore, the protruding shapes of the two inner circumferential portions 21a protruding inward are the same as each other. Each of the two inner circumferential portions 21a protruding inward reaches deep into the corresponding groove portion 11c of the two groove portions 11c that are the guide grooves 11G. Thus, the two groove portions 11c that are the guide grooves 11G come into contact with the inner circumferential surface (two inner circumferential portions 21a protruding inward) of the guide hole 21. That is, the two inner circumferential portions 21a protruding inward function as the guide protrusions 21G that guide the movable portion 11 in the movement direction along the Z direction.

On the other hand, of the inner circumferential surface of the guide hole 21, inner circumferential portions other than the two inner circumferential portions 21a do not protrude inward (guide protrusions 21G are not formed at the inner circumferential portions of the guide hole 21 that oppose to the groove portions 11c other than the two groove portions 11c that are the guide grooves 11G). In other words, on the inner circumferential surface of the guide hole 21, the guide protrusions 21G are formed only at positions opposing to the guide grooves 11G of the groove portions 11c of the movable portion 11. Therefore, the groove portions 11c other than the two groove portions 11c that are the guide grooves 11G do not contact with the inner circumferential surface of the guide hole 21. It is noted that each end of the four ribs 11d is contact with the inner circumferential surface of the guide hole 21.

Figure 9:
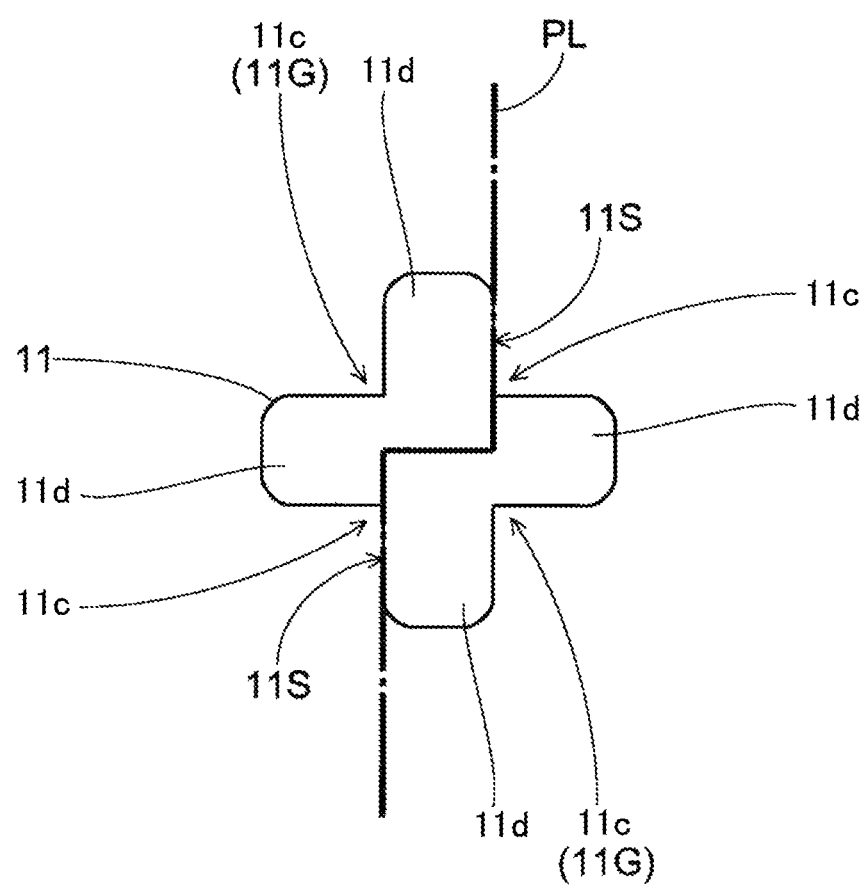
FIG. 9 is a plan view of the movable portion of the open/close detection unit shown in FIG. 4, as seen from the predetermined direction (a view for explaining positions of surfaces formed by contacting with parting surfaces of a mold).

Here, the movable member 10 is a resin molded product formed by a mold (a pair of divided molds). A portion for forming the movable portion 11, of the mold, is divided along a parting line PL as shown in FIG. 9. Therefore, of the inner surfaces of the groove portions 11c other than the two groove portions 11c that are the guide grooves 11G, a pair of surfaces 11S that are parallel with each other are formed by contacting with the parting surfaces of the mold. It is noted that the holding member 20 is also a resin molded product formed by a mold.

As described above, the image reading apparatus 200 (image forming apparatus 100) of the present embodiment includes: the placement member 1 configured to allow a document to be placed thereon as a reading target; the pressing member 8 attached so as to be openable and closable with respect to the placement member 1, and configured to press a document placed on the placement member 1 by being closed; the movable portion 11 provided in the placement member 1 and configured to, when the pressing member 8 is opened, move toward the one side (upward) in the Z direction, thereby protruding to the area between the placement member 1 and the pressing member 8, and when the pressing member 8 is closed, move toward the other side (downward) opposite to the one side in the Z direction; the guide hole 21 into which the movable portion 11 is inserted, the guide hole 21 being configured to guide movement in the Z direction of the movable portion 11; and the sensor 24 configured to detect a position in the Z direction of the movable portion 11. The movable portion 11 has the four groove portions 11c extending in the Z direction. The guide protrusions 21G are formed at the two inner circumferential portions 21a of the guide hole 21, that respectively oppose to the two groove portions 11c that are the guide grooves 11G, of the four groove portions 11c of the movable portion 11. Guide protrusions 21G are not formed at inner circumferential portions of the guide hole 21, that oppose to the groove portions 11c other than the two groove portions 11c that are the guide grooves 11G.

In the configuration of the present embodiment, the movable portion 11 moves in the Z direction in accordance with opening or closing of the pressing member 8 (the movable portion 11 slides in the Z direction in contact with the inner circumferential surface of the guide hole 21). The sensor 24 for detecting the position in the Z direction of the movable portion 11 is provided. Therefore, the open/close state (inclination angle) of the pressing member 8 can be determined based on output of the sensor 24.

Here, in the configuration of the present embodiment, since two groove portions 11c of the four groove portions 11c of the movable portion 11 are the guide grooves 11G, the guide protrusions 21G are formed at the two inner circumferential portions 21a of the guide hole 21, that respectively oppose to the two groove portions 11c that are the guide grooves 11G. Thus, the guide grooves 11G and the guide protrusions 21G are engaged with each other. Therefore, the movable portion 11 can be reliably held so that, when the movable portion 11 slides in the Z direction, the movable portion 11 does not rotate about its central axis. If the movable portion 11 is thus reliably held, the movement route in the Z direction of the portion (the detection piece 12 formed at the other end 11b of the movable portion 11) to be detected of the movable portion 11 is prevented from deviating from the detection area of the sensor 24.

Further, in this configuration, guide protrusions 21G are not formed at the inner circumferential portions of the guide hole 21 that oppose to the groove portions 11c other than the two groove portions 11c that are the guide grooves 11G. Therefore, when the movable portion 11 slides in the Z direction, the two groove portions 11c that are the guide grooves 11G of the movable portion 11 contact with the inner circumferential surface (guide protrusions 21G) of the guide hole 21, but the groove portions 11c other than the two groove portions 11c that are the guide grooves 11G of the movable portion 11 do not contact with the inner circumferential surface of the guide hole 21. Thus, even though the guide grooves 11G are formed on the movable portion 11, and the guide protrusions 21G to be engaged with the guide grooves 11G of the movable portion 11 are formed in the guide hole 21, increase in the sliding surface (a surface contacting with the inner circumferential surface of the guide hole 21) of the movable portion 11 can be suppressed. Therefore, sliding performance in the Z direction of the movable portion 11 is not decreased (the movable portion 11 smoothly slides in the Z direction).

Thus, the configuration of the present embodiment can reliably hold the movable portion 11 without decreasing sliding performance of the movable portion 11.

In addition, in the present embodiment, as described above, the shape of the movable portion 11 as seen from the one side in the Z direction is made to be a cross shape, whereby the movable portion 11 has the four groove portions 11c extending in the Z direction. Of the four groove portions 11c of the movable portion 11, the two groove portions 11c that are diagonally positioned are the guide grooves 11G. That is, the guide protrusions 21G are formed at the two inner circumferential portions 21a that respectively oppose to the two groove portions 11c that are the guide grooves 11G, of the inner circumferential surface of the guide hole 21. This configuration enables the movable portion 11 to be guided in a balanced manner.

In addition, in the present embodiment, as described above, the movable portion 11 is a resin molded product formed by a mold. Of the inner surfaces of the groove portions 11c other than the two groove portions 11c that are the guide grooves 11G, a pair of surfaces 11S that are parallel with each other are surfaces formed by contacting with the parting surfaces of the mold. Here, since burr is likely to occur on each surface 11S formed by contacting with the parting surfaces of the mold, if each surface 11S is used as a sliding surface, sliding performance in the Z direction of the movable portion 11 is deteriorated. Therefore, the surfaces 11S of the groove portions 11c other than the two groove portions 11c that are the guide grooves 11G are the surfaces formed by contacting with the parting surfaces of the mold. Thus, sliding performance in the Z direction of the movable portion 11 can be further improved.

In the present embodiment, as described above, the holding member 20 is a resin molded product formed by a mold. A mold for forming such a holding member 20 is provided with a pillar portion for forming the guide hole 21. Here, if the opening shape of the guide hole 21 is to be formed in a cross shape along the shape of the movable portion 11, the shape of the pillar portion for forming the guide hole 21 also needs to be a cross shape. Therefore, the thickness of the pillar portion for forming the guide hole 21 is decreased, whereby the strength of the mold is reduced. However, in the present embodiment, the opening shape of the guide hole 21 is a shape shown in FIG. 8. Therefore, the thickness of the pillar portion for forming the guide hole 21 can be increased, whereby the strength of the mold is increased.

It should be understood that the embodiment disclosed herein is illustrative in all aspects and is not recognized as being restrictive. The scope of the present disclosure is defined by the scope of the claims rather than by the description of the above embodiment, and includes meaning equivalent to the scope of the claims and all modifications within the scope.

For example, although the open/close detection unit DU is provided in the placement member 1 in the configuration of the above embodiment, the open/close detection unit DU may be provided in the pressing member 8.

In addition, although four groove portions 11c are formed on the movable portion 11 in the configuration of the above embodiment, three or five groove portions 11c may be formed on the movable portion 11.

Figure 10:
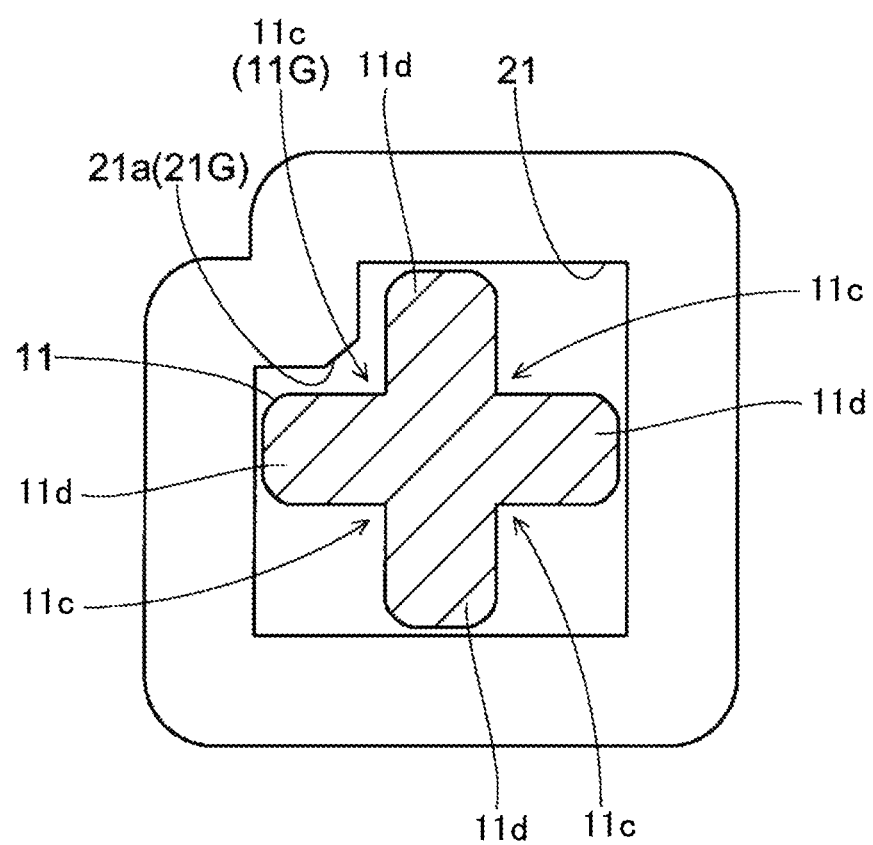
FIG. 10 is a view for explaining a modification (in the case where one groove portion is set as a guide groove) of the embodiment of the present disclosure.

In addition, although in the configuration of the above embodiment, of the four groove portions 11c, two groove portions 11c that are diagonally positioned function as the guide grooves 11G, as shown in a modification in FIG. 10, only one groove portion 11c of the four groove portions 11c may function as the guide groove 11G. In this case, the number of guide protrusions 21G (inner circumferential portions 21a protruding inward, of the inner circumferential surface of the guide hole 21) to be formed is also one.

Figure 11:
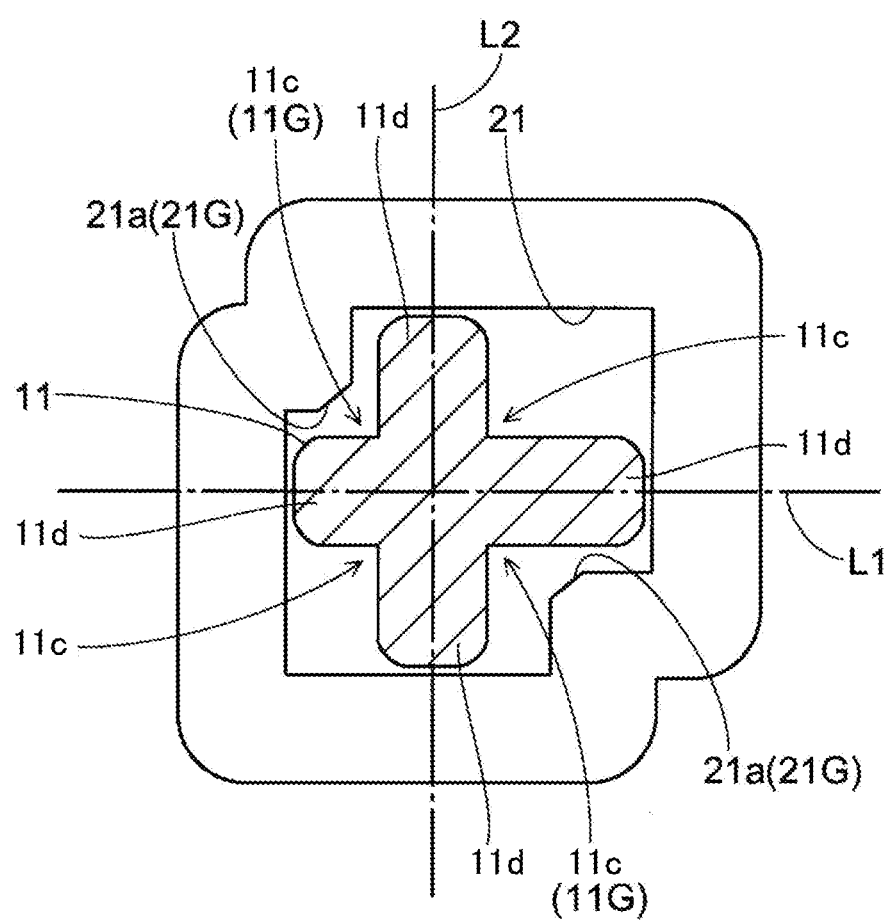
FIG. 11 is a view for explaining a modification (in the case where the groove shapes of two groove portions set as guide grooves are different from each other) of the embodiment of the present disclosure.

In addition, although in the configuration of the above embodiment, the shape of the movable portion 11 as seen from the Z direction is symmetric with respect to each of the two lines L1 and L2, as shown in a modification in FIG. 11, the shape of the movable portion 11 may be asymmetric with respect to the line L2. Specifically, in the modification shown in FIG. 11, the groove shapes of the two groove portions 11c that are the guide grooves 11G are different from each other. Of the inner circumferential surface of the guide hole 21, two inner circumferential portions 21a (guide protrusions 21G) protruding inward each have a protruding shape along the groove shape of the corresponding groove portion 11c of the two groove portions 11c that are the guide grooves 11G. Thus, upon assembly work (upon insertion of the movable portion 11 into the guide hole 21), the insertion is prevented from being performed in the state in which the direction of the two groove portions 11c that are the guide grooves 11G (that is, the direction of the detection piece 12) is wrong.

Figure 12:
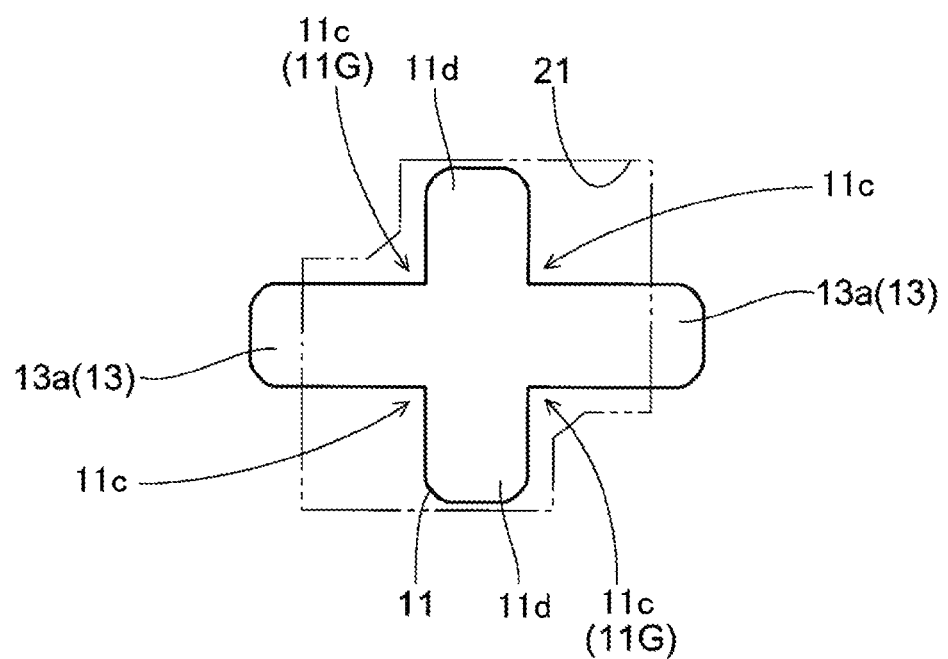
FIG. 12 is a view for explaining a modification (in the case where an engagement portion is provided at an end of the movable portion) of the embodiment of the present disclosure.
Figure 13:
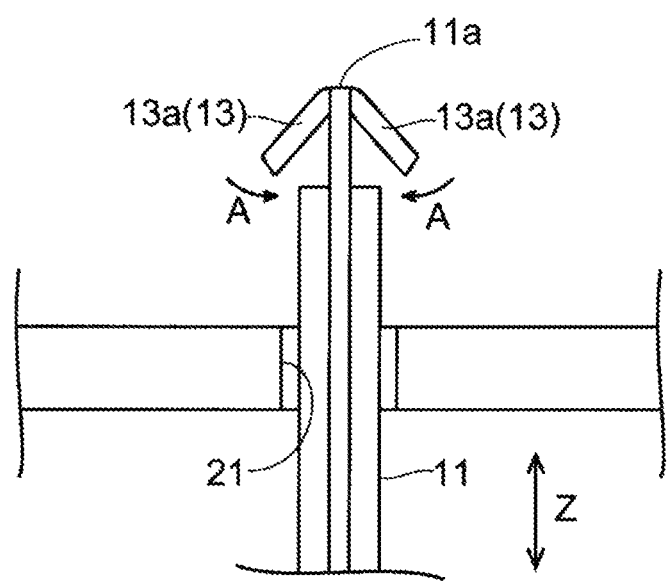
FIG. 13 is a view for explaining the modification (in the case where the engagement portion is provided at the end of the movable portion) of the embodiment of the present disclosure.

In addition, in the configuration of the above embodiment, as shown in a modification in FIGS. 12 and 13, a hook 13 may be provided at the one end 11a (an end portion protruding toward the pressing member 8) in the Z direction of the movable portion 11. It is noted that the hook 13 corresponds to an "engagement portion" of the present disclosure.

The hook 13 includes a pair of engagement pieces 13a connected to the one end 11a of the movable portion 11, and is formed in a chevron shape such that open ends of the pair of engagement pieces 13a protrude outward beyond the opening edge of the guide hole 21. Thus, when the one end 11a which is an end portion of the movable portion 11 moves toward the other side in the Z direction (moves in a direction of entering into the guide hole 21), the hook 13 is engaged with the opening edge of the guide hole 21. Therefore, the movable portion 11 is prevented from dropping out of the guide hole 21.

Further, the hook 13 (the pair of engagement pieces 13a) elastically deforms in a direction (direction A) of converging on the main body portion of the movable portion 11 so as to allow that the one end 11a of the movable portion 11 purs through the guide hole 21. Thus, even if the hook 13 is provided at the one end 11a of the movable portion 11, upon assembly work, the movable portion 11 is thrust into the guide hole 21 with the hook 13 (the pair of engagement pieces 13a) being elastically deformed in the direction A, whereby the movable portion 11 can be easily inserted into the guide hole 21. Then, when the one end 11a of the movable portion 11 protrudes from the guide hole 21, the shape of the hook 13 returns to its original shape, so that the open ends of the pair of engagement pieces 13a protrude outward beyond the opening edge of the guide hole 21. That is, the movable portion 11 is prevented from dropping out of the guide hole 21.

It is to be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. An image reading apparatus comprising:
   a placement member configured to allow a document to be placed thereon;
   a pressing member attached so as to be openable and closable with respect to the placement member, and configured to press a document placed on the placement member by being closed; and
   an open/close detection portion configured to detect opening and closing of the pressing member, wherein
   the open/close detection portion includes:
      a movable portion configured to, when the pressing member is opened, move toward one side, thereby protruding to an area between the placement member and the pressing member, and when the pressing member is closed, move toward the other side opposite to the one side, the movable portion extending along a movement direction thereof;
      a guide hole into which the movable portion is inserted, the guide hole being configured to guide movement of the movable portion in the movement direction; and
      a sensor configured to detect a position of the movable portion,
   the movable portion has a plurality of groove portions extending in the movement direction, at least one of the groove portions can work as a guide groove which guides the movement direction of the movable portion,
   the guide hole has a guide protrusion protruding from an inner circumferential surface thereof toward the groove portion of the movable portion, so as to guide movement of the movable portion, and
   the guide protrusion is formed only at a position opposing to the guide groove, of the groove portions of the movable portion, on the inner circumferential surface of the guide hole.

2. The image reading apparatus according to claim 1, wherein
   the movable portion is formed in a cross shape as seen from the movement direction, and has a plurality of ribs extending in the movement direction, and four groove portions defined by the ribs and extending in the movement direction, and
   of the four groove portions of the movable portion, two groove portions that are diagonally positioned are set as the guide grooves, and the guide protrusions are formed, at positions respectively opposing to the two guide grooves, on the inner circumferential surface of the guide hole.

3. The image reading apparatus according to claim 2, wherein
   the movable portion is a resin molded product formed by a mold, and
   of inner surfaces of the groove portions other than the two groove portions set as the guide grooves, a pair of surfaces that are parallel with each other are surfaces formed by contacting with parting surfaces of the mold.

4. The image reading apparatus according to claim 2, wherein
   groove shapes of the two groove portions set as the guide grooves are different from each other, and
   the guide protrusions each have a protruding shape along the groove shape of the corresponding guide groove to which the guide protrusion opposes.

5. The image reading apparatus according to claim 3, wherein groove shapes of the two groove portions set as the guide grooves are different from each other, and
   the guide protrusions each have a protruding shape along the groove shape of the corresponding guide groove to which the guide protrusion opposes.

6. The image reading apparatus according to claim 1, wherein at an end portion of the movable portion, an engagement portion is provided which can prevent dropout of the movable portion from the guide hole by being engaged with an opening edge of the guide hole.

7. The image reading apparatus according to claim 6, wherein the engagement portion is configured to be elastically deformable in a direction of converging on a main body portion of the movable portion so as to allow that the end portion of the movable portion puts through the guide hole.

8. An image forming apparatus comprising an image reading apparatus, the image reading apparatus including:
   a placement member configured to allow a document to be placed thereon;
   a pressing member attached so as to be openable and closable with respect to the placement member, and configured to press a document placed on the placement member by being closed; and
   an open/close detection portion configured to detect opening and closing of the pressing member, wherein
   the open/close detection portion includes:
      a movable portion configured to, when the pressing member is opened, move toward one side, thereby protruding to an area between the placement member and the pressing member, and when the pressing member is closed, move toward the other side opposite to the one side, the movable portion extending along a movement direction thereof;

a guide hole into which the movable portion is inserted, the guide hole being configured to guide movement of the movable portion in the movement direction; and a sensor configured to detect a position of the movable portion, the movable portion has a plurality of groove portions extending in the movement direction, at least one of the groove portions can work as a guide groove which guides the movement direction of the movable portion, the guide hole has a guide protrusion protruding from an inner circumferential surface thereof toward the groove portion of the movable portion, so as to guide movement of the movable portion, and the guide protrusion is formed only at a position opposing to the guide groove, of the groove portions of the movable portion, on the inner circumferential surface of the guide hole.

9. The image forming apparatus according to claim 8, wherein the movable portion is formed in a cross shape as seen from the movement direction, and has a plurality of ribs extending in the movement direction, and four groove portions defined by the ribs and extending in the movement direction, and of the four groove portions of the movable portion, two groove portions that are diagonally positioned are set as the guide grooves, and the guide protrusions are formed, at positions respectively opposing to the two guide grooves, on the inner circumferential surface of the guide hole.

10. The image forming apparatus according to claim 9, wherein the movable portion is a resin molded product formed by a mold, and of inner surfaces of the groove portions other than the two groove portions set as the guide grooves, a pair of surfaces that are parallel with each other are surfaces formed by contacting with parting surfaces of the mold.

11. The image forming apparatus according to claim 9, wherein groove shapes of the two groove portions set as the guide grooves are different from each other, and the guide protrusions each have a protruding shape along the groove shape of the corresponding guide groove to which the guide protrusion opposes.

12. The image forming apparatus according to claim 10, wherein groove shapes of the two groove portions set as the guide grooves are different from each other, and the guide protrusions each have a protruding shape along the groove shape of the corresponding guide groove to which the guide protrusion opposes.

13. The image forming apparatus according to claim 8, wherein at an end portion of the movable portion, an engagement portion is provided which can prevent dropout of the movable portion by being engaged with an opening edge of the guide hole.

14. The image forming apparatus according to claim 13, wherein the engagement portion is configured to be elastically deformable in a direction of converging on a main body portion of the movable portion so as to allow that the end portion of the movable portion puts through the guide hole.

\* \* \* \* \*